UNITED STATES PATENT OFFICE.

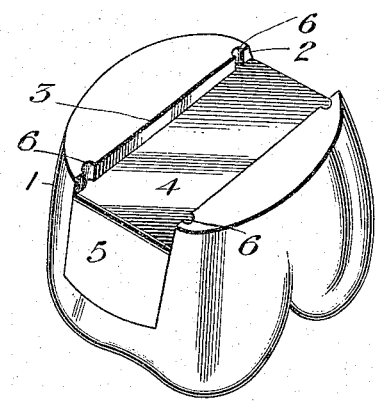
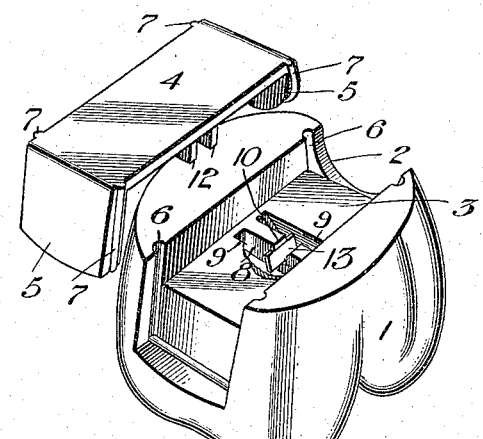
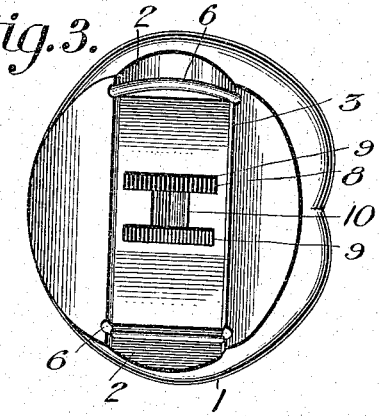
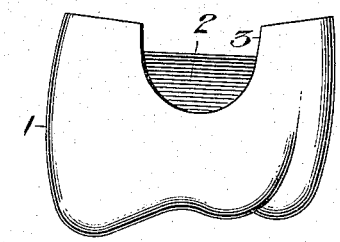
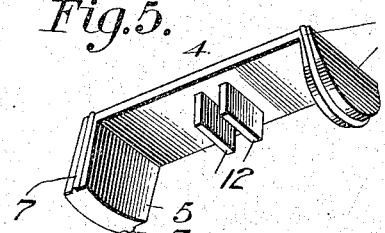
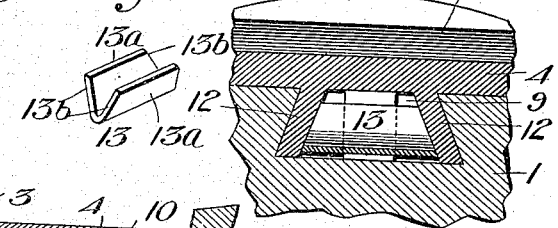
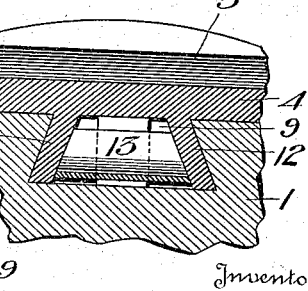
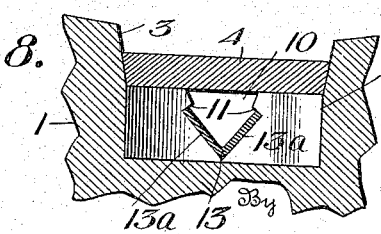

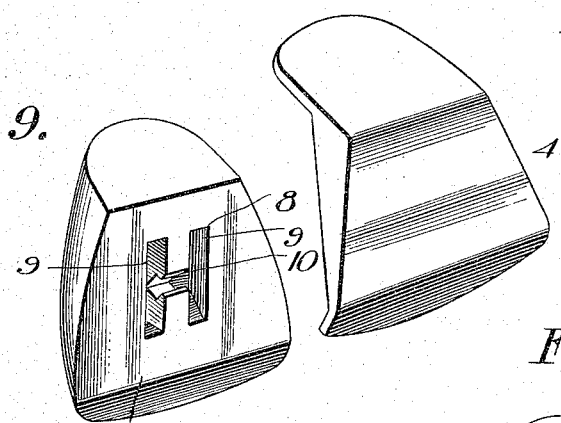
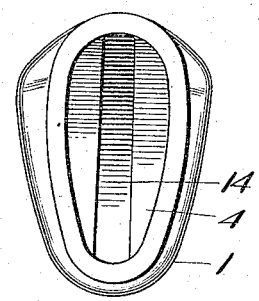
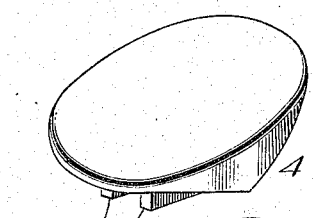
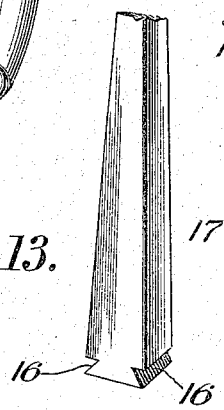
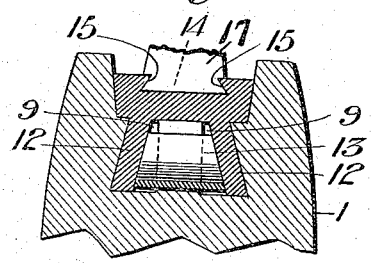

EDWARD P. CRESSLER, OF PEABODY, KANSAS.

ARTIFICIAL TOOTH.

1,172,878.  Specification of Letters Patent.  Patented Feb. 22, 1916.

Application filed September 29, 1914. Serial No. 864,098.

*To all whom it may concern:*

Be it known that I, EDWARD P. CRESSLER, a citizen of the United States, and a resident of Peabody, Marion county, and State of Kansas, have invented a new and useful Improvement in Artificial Teeth, of which the following is a specification.

This invention relates to artificial teeth and more especially to porcelain teeth and their backings for dental crowns and bridgework.

One object of the invention is to provide novel means for securing porcelain teeth, in the form of crowns or facings, to a retaining-member, in the form of a backing.

Another object of the invention is to provide a tooth-member, in the form of a crown or facing (either anterior or posterior) with means for conveniently and securely interlocking the same with coöperating means on a retaining-member or device, in the form of a backing.

Another object of my invention is to provide porcelain tooth-members, either anterior or posterior, of various shapes and sizes, so that the members for each particular size will be interchangeable and be adapted to be interlocked with a retaining-member.

Still another object within the contemplation of my invention is to provide a porcelain facing or crown with a plurality of slots, at least one of which is arranged at an angle to the other and provided with undercut walls and otherwise formed to receive tongues or projecting portions of a metallic backing member, the latter being engaged by a wedge-member disposed in one of said slots and so arranged therein that having effected a spreading apart of the tongues or projections it will engage the undercut walls of one of the slots.

With these and other objects in view, the invention resides in certain novel details of construction and in the correlative aggroupment of the parts thereof, all as more particularly hereinafter described in the following specification and set forth in the appended claims.

In the accompanying drawings: Figure 1 is a view in perspective of a porcelain tooth shown, in this instance, as interlocked with a retaining-member; Fig. 2 is a similar view, with the backing member slightly raised above the same; Fig. 3 is a view in plan of the tooth-member, by itself; Fig. 4 is a view in elevation thereof; Fig. 5 is a view in perspective of the backing member, by itself; Fig. 6 is a view in perspective of the interlocking wedge-member, by itself; Fig. 7 is a fragmentary view in central longitudinal section of the structure shown in Fig. 1; Fig. 8 is a fragmentary view in vertical transverse section thereof; Fig. 9 is a view in perspective of a different form of tooth-member, with the retaining-member, in the form of a backing-member, slightly raised away from the same; Fig. 10 is a similar view of another form of tooth-member; Fig. 11 is a view in top plan of a still different form of tooth-member, with the backing-member attached thereto; Fig. 12 is a fragmentary view in central vertical transverse section thereof, somewhat enlarged; and Fig. 13 is a view in perspective of a device for positioning the backing-member and the tooth-member.

Referring to the drawings, 1 designates a tooth-member, preferably constructed of porcelain, and, in this instance, shown as a crown. The member is provided, at opposite sides, with recesses or depressions 2 which may be rounded at one portion, as shown in Fig. 4, or square, as shown in Fig. 1. Extending longitudinally of the tooth-member and connecting the side-recesses is an elongated groove 3 adapted to receive a retaining-member 4 which, in this instance, is a backing, so-called, having end-tongues or flanges 5 adapted to be seated in the recesses 2. These recesses are each formed with a groove 6 adapted to receive a rib 7 formed at the sides of the end-portions of the backing. By this means, a secure attachment of the backing to the tooth-member may be accomplished.

Formed in the tooth-member and, in this instance, extending below the surface of the groove 3, is an approximately H-shape recess or cavity 8 comprising a pair of substantially parallel slots 9 connected by a transverse slot or notch 10. Preferably and as shown, this notch is under-cut to present inwardly-extending or overhanging projections 11, the function of which will presently be explained. The walls of the parallel slots are also undercut, as well shown in Fig. 7, to subserve a function which will presently be described.

The retaining-member 4 is preferably constructed of gold or other suitable metal usually employed to attach a tooth-member to bridge-work (not herein shown) and is in at least two forms, namely, that already hereinabove described and, also, that shown in Figs. 9, 10 and 12. Where I herein refer to a "retaining-member," it is to be understood that this comprehends both of these forms, and (in fact) any other similar form of structure upon which a tooth-member is to be mounted in connection with crowns and bridge-work. The retaining-member is, preferably and as shown in Figs. 5 and 12, provided with one or more tongues 12 of such dimensions as to be insertible in the slots 9 in the tooth-member. Normally, the inner faces of these tongues are in substantial parallelism. The tongues are, however, capable of being deformed or bent somewhat, as will hereinafter be pointed out.

Adapted to be disposed in the transverse slot or notch 10 in the tooth-member is an anchoring or wedge-member 13 which, in this instance, is of resilient metal and comprises two portions 13ª formed with beveled ends 13ᵇ. This wedge-member is positioned in the notch so that the outspread portions 13ª extend upwardly and at right-angles to the parallel slots. The beveled ends extend into these parallel slots and are in substantial parallelism with the undercut walls thereof.

It will be seen that when the retaining-member is being positioned on its backing and its tongues are entering the parallel slots therein, these tongues will engage the beveled ends of the wedge-member and be spread apart so as to engage the undercut walls thereof. The upper edges of the wedge-member will engage the inwardly-projecting portions of the undercut walls of the notch, and whereby it will become locked in the notch and at the same time effect an interlocking of the retaining-member with the tooth-member. The wedge-member has, therefore, a dual function; that is to say, it first spreads apart the tongues of the retaining-member and forces them into engagement with the walls of the parallel slots; and, then, by its engagement with the walls of the notch, it effects an interlocking of the retaining and tooth-members. There is thus presented a rigid fastening which, though simple and compact, combines all requisite strength and durability to insure the proper retention of the tooth-member upon the retaining-member. In the event, however, that it be necessary or desired to replace a broken or injured tooth-member, of a given size and type, another tooth-member of the same character may be substituted therefor and exactly fit the intact backing or retaining previously soldered or otherwise secured to the bridge-work.

As already noted, my invention is applicable to backing retaining-members, of even or varied thickness, and of different forms. In Figs. 9 to 12, the invention is disclosed in connection with a backing in which instance the H-shaped recess extends longitudinally of the tooth, rather than transversely thereof, as in Fig. 3, for example.

In Fig. 10, the tooth-member is disclosed as in the form of a facing, and is attached to the backing-member in the manner already explained.

In Fig. 11, the structure is disclosed in a somewhat different form: In this instance, the tooth-member is shown as a porcelain crown, of posterior form. The backing is provided with a longitudinal groove 14 having undercut walls 15, adapted to receive the correspondingly beveled faces 16 of a metallic retaining-pin 17, by which the backing and tooth-member are attached to a natural tooth in the mouth. In other words, one end of the pin is secured in the groove while the upper portion of the pin is secured in a natural tooth. In some instances, I may dispense with the H-shaped recess in the tooth-member and with the tongues on the backing-member, and utilize the end-portions, provided with ribs, or the like, to effect a rigid securement of the backing to the tooth-member. Where an all-porcelain bridge is to be constructed, the backing may be made of platinum, for instance, and several of these backings be soldered together by the dentist, who would then attach to each of the backings one of my crowned tooth-members, after which he would fuse porcelain at the bottom thereof.

Where I have herein referred to "tooth-member," it is to be understood that this comprehends either a crown or facing, and of the anterior or posterior types. Moreover, where I have herein referred to "tongue-carrying retaining members," this expression refers to backings; of different forms which centrally carry a pair of tongues or projections, or to backings which at their ends carry end-projections or tongues, since, in all instances, the tooth-member, whatever its character, is provided with recesses adapted to receive the projections of the backing-member.

From the foregoing, it will be perceived that I have succeeded in devising a tooth-structure which is well adapted to achieve the several objects and ends in view. It is simple and compact in form and capable of convenient and ready assemblage.

As many changes may be made in the above-described constructions and many widely different embodiments of the invention can be made without departing from its spirit, it is intended that all matter contained in the foregoing description and shown in the appended drawings shall be interpreted as illustrative and not in a limiting sense. Moreover, it is to be understood that the language used in the following claims is intended to cover not only the specific features of the invention but the generic features as well.

What I claim is:

1. An artificial tooth-structure including a tooth-member provided with a plurality of slots, at least one of which is arranged at an angle to the other and provided with undercut walls, a retaining-member provided with a tongue insertible in one of said slots, and a spreading-member disposed in said angularly-arranged slot and adapted to engage with said undercut walls and with the tongues, whereby the tooth and retaining members are interlocked.

2. A tooth-member provided with a plurality of slots, at least one of which is arranged at an angle to two others and provided with undercut walls, a retaining-member provided with tongues insertible in two of the slots, and a wedge-member disposed in said angularly-arranged slot and interlockingly engaging with said walls and tongues to secure the retaining-member to the tooth-member.

3. A tooth-structure including a tooth-member provided with a plurality of undercut, substantially parallel slots joined by an intermediate notch having inwardly-extending projections, a retaining-member provided with parallel tongues adapted to enter the slots, and a resilient wedge-member interlockingly disposed in said notch and engageable with the tongues to spread them apart and position them beneath the undercut walls of the slot.

4. A tooth-structure including a tooth-member provided with an approximately H-shaped recess, a retaining-member provided with tongues extending into the recess, and a wedge-member disposed in said recess and interlockingly engaging with the walls of the recess and with the tongues.

5. A tooth-structure including a tooth-member provided with an approximately H-shaped recess having under-cut walls, a retaining-member provided with tongues extending into the recess, and a wedge-member disposed in said recess and engaging the undercut walls thereof and also effecting a spreading of the tongues toward other of the undercut walls of the recess.

6. A tooth-structure including a porcelain-tooth provided with a pair of approximately parallel slots connected by a notch having undercut walls, a retaining-member carrying a pair of tongues insertible in said slots and bridging said notch, and a wedge-member beveled at its ends and disposed in said notch to engage with the undercut walls, said wedge-member being engageable by said tongues to effect their spreading apart and engagement with the walls of said parallel slots, whereby the tooth and retaining-member are interlocked.

7. A tooth-structure including a porcelain-tooth member provided with a pair of undercut, parallel slots connected by a notch having overhanging, wedge-engaging projections, a metallic retaining-member provided with a pair of parallel tongues disposed in said slots and at an angle to the walls of said notch, and a spring wedge-member having beveled ends extending into said slots and in the path of said tongues to spread them apart and effect an interlocking engagement of the tooth and retaining members.

8. A tooth-structure including a tooth-member provided with an elongated groove and with two parallel slots connected by an intermediate notch having undercut walls, a retaining-member adapted to be seated in said groove and having tongues extending into said slots, and a wedge-member engageable with said undercut walls and with said tongues to spread them apart and effect an interlocking of the retaining-member with the tooth-member.

9. An artificial tooth-structure including a tooth-member formed with a member-engaging surface and provided with a pair of elongated spaced-apart slots, one substantially parallel with the other and both of approximately the same dimensions; and a retaining-member attachable to the tooth-member and having a tooth-engaging face corresponding substantially to the member-engaging surface of the tooth-member and provided with a pair of elongated, spaced-apart and substantially parallel tongues of approximately the same dimensions and insertible in said parallel slots.

10. An artificial tooth-structure including a tooth-member provided with a pair of spaced-apart, substantially parallel slots of approximately the same dimensions and with a cross-notch extending between and connecting said parallel slots, and a retaining-member provided with a pair of spaced-apart, substantially parallel tongues of approximately the same dimensions and insertible in said parallel slots.

11. A tooth-structure including a tooth-member provided with a plurality of slots angularly arranged relatively and having undercut walls, a retaining-member provided with tongues having an interlocking engagement with said slots and provided also with a groove with undercut walls, a pin-member engageable in said groove, and a wedge-member disposed in the slots in the tooth-member and engageable with the tongues of the tooth-member.

In testimony whereof I hereunto set my hand this 24th day of September, 1914, in the presence of two attesting witnesses.

EDWARD P. CRESSLER.

Witnesses:
ALFRED R. KENT,
HOWARD A. RAY.

Copies of this patent may be obtained for five cents each, by addressing the "Commissioner of Patents, Washington, D. C."